(12) United States Patent
Ilola et al.

(10) Patent No.: US 11,259,050 B2
(45) Date of Patent: Feb. 22, 2022

(54) SIX DEGREES OF FREEDOM SPATIAL LAYOUT SIGNALING

(71) Applicant: Nokia Technologies Oy, Espoo (FI)

(72) Inventors: Lauri Ilola, Tampere (FI); Kimmo Roimela, Tampere (FI); Vinod Kumar Malamal Vadakital, Tampere (FI); Jaakko Keranen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/019,591

(22) Filed: Sep. 14, 2020

(65) Prior Publication Data

US 2021/0092444 A1  Mar. 25, 2021

Related U.S. Application Data

(60) Provisional application No. 62/902,519, filed on Sep. 19, 2019.

(51) Int. Cl.
| | |
|---|---|
| *H04N 19/597* | (2014.01) |
| *H04N 19/142* | (2014.01) |
| *H04N 13/161* | (2018.01) |
| *H04N 19/147* | (2014.01) |

(52) U.S. Cl.
CPC ......... *H04N 19/597* (2014.11); *H04N 13/161* (2018.05); *H04N 19/142* (2014.11); *H04N 19/147* (2014.11)

(58) Field of Classification Search
None
See application file for complete search history.

(56) References Cited

U.S. PATENT DOCUMENTS

2020/0202608 A1*  6/2020  Mekuria ............ H04L 65/4084

OTHER PUBLICATIONS

Park, J., et al., "Volumetric Media Streaming for Augmented Reality", IEEE 2018, 6 pgs.
Yip, E., et al., "6DoF Access of V-PCC Data", Samsung Electronics Co. Ltd., ISO/IEC, JTC1/SC29/WG11 MPEG2019/m46040, Jan. 2019, 6 pgs.
Zhao, S., et al., "SDN-Assisted Adaptive Streaming Framework for Tile-Based Immersive Content Using MPEG-Dash", IEEE 2017, 6 pgs.
"Text of ISO/IEC FDIS 23009-1 $4^{th}$ edition" WG 11 n18609 MPEG Document Management System, Aug. 15, 2019, 287 pgs.

* cited by examiner

*Primary Examiner* — Christopher Braniff
(74) *Attorney, Agent, or Firm* — Harrington & Smith

(57) ABSTRACT

Apparatuses, methods, and computer programs are disclosed to implement six degrees of freedom spatial layout signaling. An example apparatus includes at least one processor; and at least one non-transitory memory including computer program code; wherein the at least one memory and the computer program code are configured to, with the at least one processor, cause the apparatus at least to perform: segment a scene of volumetric video into one or more sequences, each sequence comprising one or more sub viewing volumes having one or more bitstream alternatives; generate viewing volume and view point indications within one or more dynamic adaptive streaming over hypertext transfer protocol media presentation description files; generate one or more sub volume scheme uniform resource identifiers for client side instructions to retrieve content; and provide one or more of the sub viewing volumes based on a client selection and request.

24 Claims, 11 Drawing Sheets

```
<xs:complexType name="AdaptationSetType">
  <xs:complexContent>
    <xs:extension base="RepresentationBaseType">
      <xs:sequence>
        <.../>
        <xs:element name="ViewingVolumeCentroid" type="PointType" minOccurs="0" maxOccurs="1"/>   ← 302
        <.../>
      </xs:sequence>
    </xs:extension>
  </xs:complexContent>
</xs:complexType>
```

FIG.3

```
<xs:complexType name="AdaptationSetType">
  <xs:complexContent>
    <xs:extension base="RepresentationBaseType">
      <....../>
      <xs:attribute name="ViewingVolumeCentroidX"
         type="xs:float" required="false"/>
      <xs:attribute name="ViewingVolumeCentroidY"
         type="xs:float" required="false"/>
      <xs:attribute name="ViewingVolumeCentroidZ"
         type="xs:float" required="false"/>
    </xs:extension>
  </xs:complexContent>
</xs:complexType>
```

FIG. 4

```
<xs:complexType name="MPDtype">
    <xs:sequence>
        <.../>
        <xs:element name="ViewingVolume" type="ShapeType" minOccurs="0" axOccurs="1"/>
    </xs:sequence>
    <.../>
</xs:complexType>
```

FIG.6

```
<xs:complexType name="PeriodType">
    <xs:sequence>
        <.../>
        <xs:element name="ViewingVolume" type="ShapeType" minOccurs="0" maxOccurs="1"/>
    </xs:sequence>
    <.../>
</xs:complexType>
```

FIG.7

SIX DEGREES OF FREEDOM SPATIAL LAYOUT SIGNALING

RELATED APPLICATION

This application claims priority to U.S. Provisional Application No. 62/902,519, filed Sep. 19, 2019, which is hereby incorporated by reference in its entirety.

TECHNICAL FIELD

The examples and non-limiting embodiments relate generally to multimedia and software, and more particularly, to six degrees of freedom spatial layout signaling.

BACKGROUND

It is known to perform video coding and decoding.

SUMMARY

The following summary is merely intended to be an example. The summary is not intended to limit the scope of the claims.

In accordance with an aspect, an apparatus includes at least one processor; and at least one non-transitory memory including computer program code; wherein the at least one memory and the computer program code are configured to, with the at least one processor, cause the apparatus at least to perform: segment a scene of volumetric video into one or more sequences, each sequence comprising one or more sub viewing volumes having one or more bitstream alternatives; generate viewing volume and view point indications within one or more dynamic adaptive streaming over hypertext transfer protocol media presentation description files; generate one or more sub volume scheme uniform resource identifiers for client side instructions to retrieve content; and provide one or more of the sub viewing volumes based on a client selection and request.

In accordance with an aspect, an apparatus includes at least one processor; and at least one non-transitory memory including computer program code; wherein the at least one memory and the computer program code are configured to, with the at least one processor, cause the apparatus at least to perform: monitor a viewing position of a client device within a viewing volume level of one or more media presentation description files; request new viewing volume data when approaching one or more edges of a level of at least one of the media presentation description files; select one or more sub volume atlas streams from a media presentation description file based on the viewing position and an orientation of the client device; and render a novel view from the selected one or more sub volume atlas streams, wherein the rendering comprises combining individual immersive video streams as a union of currently streamed sub viewing volumes of a scene.

In accordance with an aspect, a method includes segmenting a scene of volumetric video into one or more sequences, each sequence comprising one or more sub viewing volumes having one or more bitstream alternatives; generating viewing volume and view point indications within one or more dynamic adaptive streaming over hypertext transfer protocol media presentation description files; generating one or more sub volume scheme uniform resource identifiers for client side instructions to retrieve content; and providing one or more of the sub viewing volumes based on a client selection and request.

In accordance with an aspect, a method includes monitoring a viewing position of a client device within a viewing volume level of one or more media presentation description files; requesting new viewing volume data when approaching one or more edges of a level of at least one of the media presentation description files; selecting one or more sub volume atlas streams from a media presentation description file based on the viewing position and an orientation of the client device; and rendering a novel view from the selected one or more sub volume atlas streams, wherein the rendering comprises combining individual immersive video streams as a union of currently streamed sub viewing volumes of a scene.

BRIEF DESCRIPTION OF THE DRAWINGS

The foregoing aspects and other features are explained in the following description, taken in connection with the accompanying drawings, wherein:

FIG. 3 is an example code excerpt that shows signaling of sub viewing volume to an adaptation set.

FIG. 4 is an example code excerpt that shows signaling of the centroid of the sub viewing volume.

FIG. 6 is an example code excerpt that shows signaling of the sub viewing volume information on the MPD level.

FIG. 7 is an example code excerpt that shows signaling of the sub viewing volume information within Periods.

DETAILED DESCRIPTION OF EXAMPLE EMBODIMENTS

Figure 1:
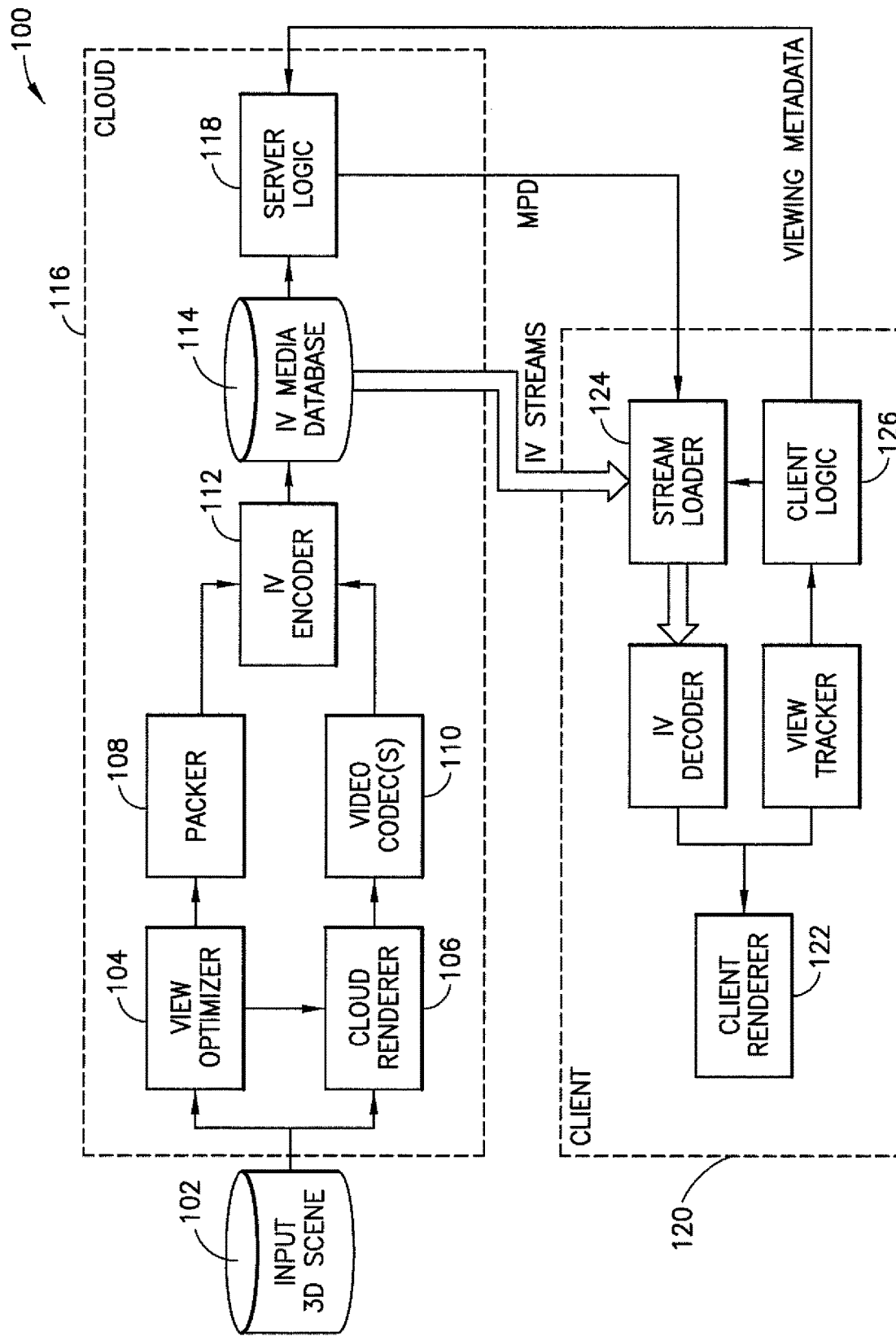
FIG. 1 is a block diagram depicting compression and consumption of a volumetric video scene.

The following acronyms and abbreviations that may be found in the specification and/or the drawing figures are defined as follows:
  2D or 2d two-dimensional
  2k a horizontal resolution of approximately 2,000 pixels on a display device or content, or 2048×1080
  3D or 3d three-dimensional
  6DOF or 6DoF six degrees of freedom
  720p 1280×720 px
  1080p 1920×1080 px
  codec coder-decoder
  DASH Dynamic Adaptive Streaming over HTTP
  DB database
  GPU graphics processing unit
  HTTP HyperText Transfer Protocol id or ID identification
IV immersive video
JSON JavaScript Object Notation
max maximum
mimeType Multipurpose Internet Mail Extensions
min minimum
MIV metadata for immersive video
MPD Media Presentation Description
.mpd file extension for Media Presentation Description files
MPEG moving picture experts group
MPEG-I MPEG immersive
MPEG-2 second of several standards developed by the Moving Pictures Expert Group
mp2t MPEG-2 TS Byte Stream Format
Neg negative
N# International Organization for Standardization document number
PCC point cloud coding/compression
Pos positive
px pixel
.sidx Stuffit Archive Index Files
ts timescale
URI uniform resource identifier
url or URL uniform resource locator
XML extensible markup language
xs XML schema The examples described herein relate to volumetric video coding, where dynamic 3D objects or scenes are coded into video streams for delivery and playback. The MPEG standards PCC (Point Cloud Compression) and MIV (Metadata for Immersive Video) are two examples of such volumetric video compression.

For limited viewing volume immersive video (MPEG-I part 12) the work is progressing to generate partial views and patches that segment the scene and contain regions occluded from a single point of view. Storing such information usually contributes to larger data amounts than traditional 360 degree videos. It has been discovered that even with a significantly limited viewing volume the amount of compressed content may require several 2k atlases worth of geometry and texture data. Removing or easing limitations on the viewing volume to allow a viewer to freely explore the scene explodes the amount of data required, thus making local storage of such experiences unviable. Partial streaming of pre-rendered content could be considered as a solution to such problem which today remains mostly unexplored.

Entire scenes of pre-rendered volumetric data cannot be stored locally and while high-end GPUs capable for raytracing are now being introduced, real-time raytracing with full global illumination is not realistic in mainstream computing devices for a long time, thus another solution for experiencing immersive video is needed. Especially the challenging case of real world captured content requires novel approaches to be developed. Techniques for partial streaming of limited sub viewing volumes do not exist yet.

In traditional 360 video viewport based adaptation has been used to improve quality. In this case signaling between server and client application have been defined to enable such experiences. Similar concepts and methods may be applied to streaming of limited viewing volumes, with some adjustments.

MPEG part 12 defines how volumetric video for limited viewing volumes may encoded but does not define how larger viewing volumes may be achieved.

MPEG DASH defines how video may be adaptively streamed from a server to a client device, but streaming tools for volumetric content do not exist yet.

In general, the examples described herein relate to creating signaling between a server and client to enable selective streaming of sub-volumes of volumetric content for large scenes with arbitrary viewing volumes. Architecturally the examples described herein cover techniques related to the server side content segmentation as well as client side content consumption and the related signaling between the two.

On the server volumetric content is pre-processed and segmented into streamable subdivisions fit for consumption. The process involves analysis of the scene based on which the scene is divided into subdivisions which are volumetrically encoded for example using MPEG-I part 12 like technologies. On the server side the examples described herein cover the following topics: i) subdivision into possibly overlapping sub viewing volumes. Centroids of the sub viewing volumes may form a grid or tetrahedral mesh which may be used to select preferred sub viewing volumes for any viewing point within the scene viewing volume; ii) segmentation into short sequences that enable fast switching between viewing volumes (DASH+SegmentTemplates) while keeping MPD-files relatively short; iii) adding viewing volume and view point indications in DASH MPD-files; iv) generation of sub volume scheme URIs for client side instructions to fetch content; v) methods for location based MPD responses (client requests an MPD-file with a particular viewing position, server responds by sending the best fitting MDP file to reduce the amount of information that is streamed to the client in the form of MPD files, requires overlapping viewing volumes for MPD-files); and vi) methods for dynamic MPD-file generation based on client viewing positions.

On the client application position of the viewer in the scene is tracked, which is used to request sub-volumes of volumetric video from the server. The client continuously monitors its position in relation to viewing volumes in the MPD-file and requests only best fitting sub-volume atlas streams that are used to render views. Accordingly, the examples described herein further cover the following topics: i) monitoring viewing position within the MPD-level viewing volume to request new viewing volume data when approaching edges of the MPD-level viewing volume; ii) choosing correct sub-volume atlas streams from the MPD-file based on viewing position; and iii) rendering novel views from one or more volumetric video streams.

First the overall volumetric video compression pipeline is described. Then the essential idea of enabling selective streaming of sub viewing volumes is described.

FIG. 1 is a block diagram 100 depicting compression and consumption of a volumetric video scene, in accordance with the examples described herein. Fundamentally, each frame of the input 3D scene 102 is processed separately. The resulting per-frame atlas and metadata are then stored into video and metadata streams, respectively.

The first part converts the input 3D scene 102 into a canonical representation for processing. Depending on the source, the input scene 102 may consist of, for example, a procedurally animated 3D scene, animated 3D meshes, or registered camera views with depth maps. The input is sampled at an internal processing frame rate and converted into a collection of 3D samples of the scene geometry at a specified internal processing resolution. Depending on the input, this may involve e.g. voxelizing a mesh model, or down-sampling a high resolution point cloud with very fine details into the processing resolution. The internal representation is finally a collection of scene data points registered in a common 3D scene coordinate system, representing all aspects of the 3D input scene 102. Example aspects may include but are not limited to the color, geometry, and surface normals of the 3D scene 102.

The View Optimizer 104 takes the internal representation and creates a segmentation of the scene optimized for a specified viewing constraint (the viewing volume). This involves creating view-tiles that have sufficient coverage and resolution for representing the original input scene at minimal quality degradation within the given viewing constraints. The View Optimizer 104 makes use of at least the 3D position of the data points in the scene, but additional attributes such as surface normals, colors, material attributes, and viewing and capture directions may also be considered. Furthermore the View Optimizer 104 may divide the view-tiles into several sub viewing volumes if larger movement around the scene is intended and/or the scene is very complex. The sub viewing volumes may be pre-defined by the content author, or automatically generated based on the input scene 102. The size or bitrate of a single sub viewing volume may be constrained, and all view-tiles in a single sub viewing volume are spatially local to each other to enable efficient streaming.

The resulting view-tiles for one or more sub viewing volumes may then be pre-rendered in the Cloud Rendering 106 stage. This may involve resampling an input point cloud into 2D tile projections, or calling an external renderer, e.g. a path tracing renderer, to render views of a 3D input scene. For natural camera inputs, virtual views may be synthesized by view interpolation between the original input views, or parts of the input views may be used directly to produce the rendered tiles.

For each sub viewing volume the rendered tiles are then input into a Packer 108, which produces an optimal 2D layout metadata of the rendered view-tiles which may be used to pack pre-rendered tiles into video frames. The additional metadata that is required to unpack and re-render the packed tiles is also generated by the packer 108. These packed atlases along with the associated metadata are then piped to Video Codecs 110 and IV Encoder 112 for generating compressed representations.

After generating the compressed representation for each sub viewing volume the bitstreams may be further segmented for DASH compatible playback. This may include creation of different adaptations of the same viewing volume by resolution, bitrate, codec or other variable. Information about different viewing volumes and encoded representations is utilized by the Server Logic 118 or may be stored inside static MPD files.

For viewing the volumetric video, the information about different sub viewing volumes and representations need to be made available to client devices, such as client 120, which perform view synthesis of novel views based on user viewport. This information may be signaled using DASH technology. The IV streams may be provided from the IV media database 114 of the cloud 116 to the stream loader 124 of the client 120. Each IV stream contains the necessary information for the view synthesizer to employ rendering methods using the client renderer 122 such as point cloud rendering, mesh rendering, or ray-casting to reconstruct a view of the scene from any given 3D viewpoint within the IV stream viewing volume (corresponding to a single sub viewing volume). Only relevant IV stream(s) are retrieved from the content server (e.g., cloud 116) to minimize the content streamed to the client device 120, thus enabling larger viewing volumes. These individual IV streams may be combined in the client renderer 122 to achieve a larger local viewing volume which is the union of the currently streamed sub viewing volumes. This way, real-time 3D viewing of the volumetric video for arbitrary large viewing volumes may be achieved.

In order to achieve selective streaming of volumetric sub volumes additional metadata is needed in DASH manifest i.e. MPD-file. Depending on the way client devices consume content the metadata may be signaled in several different ways. On the highest level a DASH MPD file for a volumetric video may contain one or more Periods (e.g., Periods 204 and 206), which contain several Adaptation Sets (e.g., Adaptation Sets 208 and 210) for different sub viewing volumes (e.g., sub viewing volumes 216 and 218). Each viewing volume may have different resolution and bitrate alternatives (e.g., Bitstream alternatives 220 and 222), which may be represented as different Representations (e.g., 212, 214) in an Adaptation Set (e.g., 208 or 210).

Figure 2:
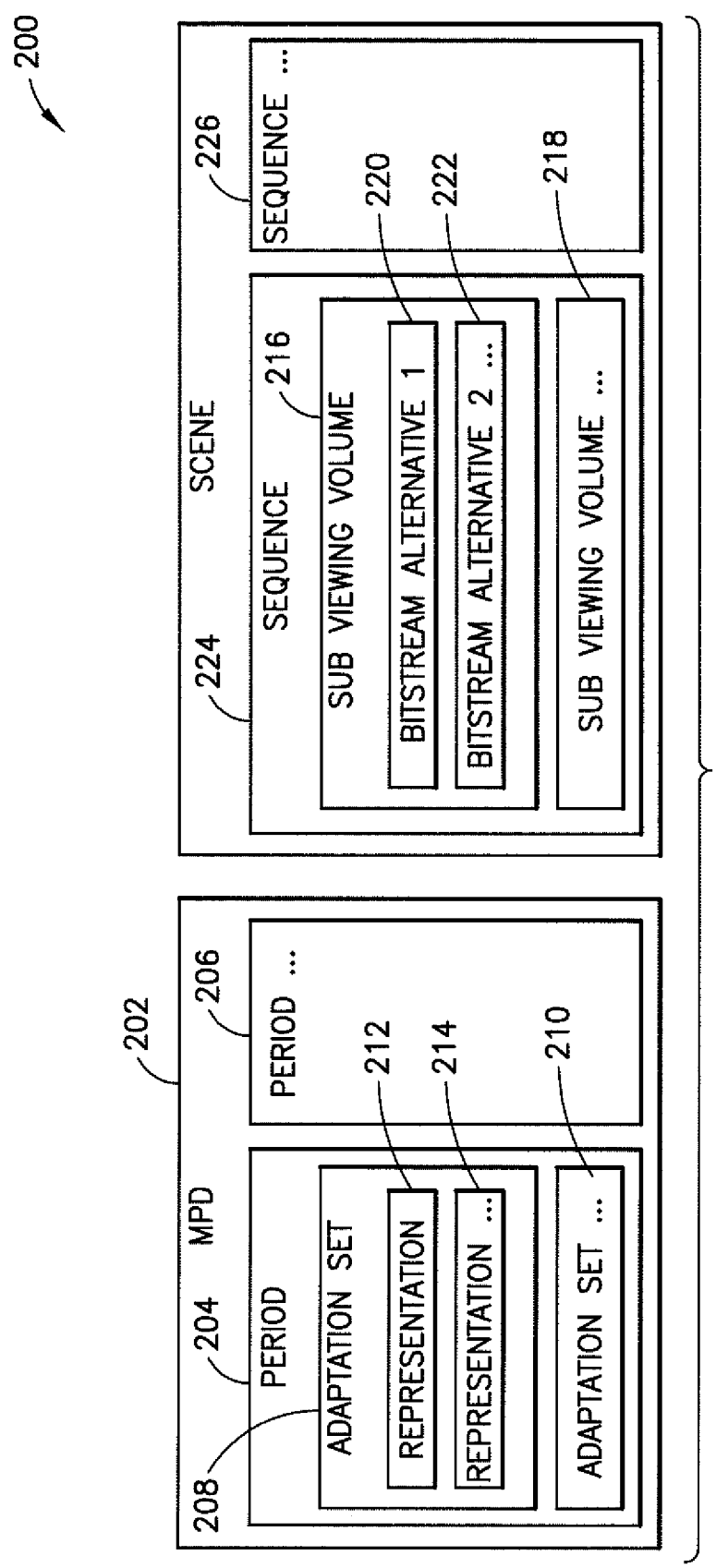
FIG. 2 is an example block diagram illustrating the semantic mapping between MPD file and volumetric video.

FIG. 2 is an example block diagram 200 illustrating the semantic mapping between an MPD file 202 and volumetric video. The structural mapping of sub viewing volumes (e.g., sub viewing volumes 216 and 218) into MPD file structures (such as MPD 202) is an important part of the examples described herein. As further shown in FIG. 2, the scene sequences (224, 226) are comprised of the sub viewing volumes (216, 218).

It is recommended to utilize SegmentTemplate functionality in DASH to define short segments without bloating the overall DASH file with individual Segment lists. Below is a short example how SegmentTemplate may be used to reconstruct small segments.

```
<Period duration="PT10S">
    <BaseURL>content/</BaseURL>
    <!-- Everything in one Adaptation Set -->
    <AdaptationSet mimeType="video/mp2t">
        <!-- 720p Representation at 3.0 Mbps -->
        <Representation id="720p" bandwidth="3000000" width="1280" height="720">
            <BaseURL>720/</BaseURL>
            <!-- Example of SegmentTemplate -->
            <SegmentTemplate media="segment-$Number$.ts" timescale="1">
                <RepresentationIndex sourceURL="representation-index.sidx"/>
                <!-- SegmentTimeline for convenience for the client -->
                <SegmentTimeline>
                    <!-- Starting from time 0, there are 10 segments with a duration of (1 / @timescale) seconds-->
                    <S t="0" r="10" d="1"/>
                </SegmentTimeline>
            </SegmentTemplate>
        </Representation>
        <!-- 1080p Representation at 5.4 Mbps -->
        <Representation id="1080p" bandwidth="5400000" width="1920" height="1080">
            <BaseURL>1080/</BaseURL>
            <!-- Example of SegmentTemplate -->
            <SegmentTemplate media="segment-$Number$.ts" timescale="1">
                <RepresentationIndex sourceURL="representation-index.sidx"/>
                <!-- SegmentTimeline for convenience for the client -->
                <SegmentTimeline>
                    <!-- Starting from time 0, there are 10 segments with a duration of (1 / @timescale) seconds-->
                    <S t="0" r="10" d="1"/>
                </SegmentTimeline>
            </SegmentTemplate>
        </Representation>
    </AdaptationSet>
</Period>
```

New data structures for DASH manifest. There are some common elements that are used later by other embodiments of the examples described herein. Firstly, there needs to be a definition for a 3d point in space, which is required by most primitives used to define viewpoints and viewing volumes. This PointType may contain three floating point values representing 3d point in space as x, y and z component.

```
<xs:complexType name="PointType">
    <xs:attribute name="x" type="xs:float" required="true"/>
    <xs:attribute name="y" type="xs:float" required="true"/>
    <xs:attribute name="z" type="xs:float" required="true"/>
</xs:complexType>
```

Secondly to define viewing points a set of shapes needs to be defined that may be used and combined to generate arbitrary viewing volumes. For more details on the viewing volume definition, please refer to PCT/FI2019/050585. For illustration we define here a few examples. Each shape may need to contain an id so that the shapes may be combined. ShapeType shall be defined as an abstract root class which is used by the rest of the refined shapes. ShapeType may optionally contain an order id, which is useful when combining different shapes with arithmetic operations.

```
<xs:complexType name="ShapeType" abstract="true">
    <xs:attribute name="id" type="xs:unsignedInt" required="true"/>
    <xs:attribute name="order" type="xs:unsignedInt" required="false"/>
</xs:complexType>
```

Cuboid shape may contain two points, minimum and maximum values, with which a 3d cuboid may be represented.

```
<xs:complexType name="CuboidType">
    <xs:complexContent>
        <xs:extension base="ShapeType">
            <xs:element name="min" type="PointType" required="true"/>
            <xs:element name="max" type="PointType" required="true"/>
        </xs:extension>
    </xs:complexContent>
</xs:complexType>
```

The sphere may contain a single point representing the origin of the sphere and may have a radius information which may indicate the size of the sphere around the origin.

```
<xs:complexType name="SphereType">
    <xs:complexContent>
        <xs:extension base="ShapeType">
            <xs:element name="origin" type="PointType" required="true"/>
            <xs:attribute name="r" type="xs:float" required="true"/>
        </xs:extension>
    </xs:complexContent>
</xs:complexType>
```

In addition to different shapes there may need to be a method to combine different shapes to create constructs of the shapes. As with the rest of the shapes, the Group inherits id from ShapeType, so that later combining different groups becomes available. In addition, it may contain an operator attribute, which explains how different primitives are combined. Valid values for the operator may be defined, like + for adding primitives or − for subtracting primitives. The order of the primitives (defined in ShapeType) describes the order in which the operations may be applied to primitives in the group. The operations may be performed first with two lowest order primitives and then to following primitives. Subtraction may take the lowest order primitive and subtract the second lowest order primitive from it, then proceed until all primitives are processed.

```
<xs:simpleType name="OperatorType">
    <xs:restriction base="xs:string">
        <xs:enumeration value="+"/>
        <xs:enumeration value="-"/>
    </xs:restriction>
</xs:simpleType>
<xs:complexType name="GroupType">
    <xs:complexContent>
        <xs:extension base="ShapeType">
            <xs:sequence>
                <xs:element name="primitive" type="ShapeType" minOccurs="2" maxOccurs="unbounded"/>
            </xs:sequence>
            <xs:attribute name="operator" type="OperatorType"/>
        </xs:extension>
    </xs:complexContent>
</xs:complexType>
```

Static MPD file with client-side logic. In the first embodiment an MPD file may contain a list of all available sub viewing volumes, in which case the client device chooses best fitting Adaptation Sets from the MPD file by itself. This is a simple solution that may work well for fairly small scenes, which do not consist of hundreds or thousands of sub viewing volumes. Because of the design simplicity, this may likely be the most important embodiment. From a signaling perspective MPEG DASH MPD Adaptation Sets would need information about the sub viewing volume centroids for the Client to select the optimal sub viewing volumes.

FIG. 3 is an example code excerpt 300 that shows signaling of sub viewing volume centroid to an adaptation set. Reference number 302 of FIG. 3 (code also provided below) highlights changes that may be required to the MPEG DASH specification.

```
<xs:complexType name="AdaptationSetType">
    <xs:complexContent>
        <xs:extension base="RepresentationBaseType">
            <xs:sequence>
                <.../>
                <xs:element name="ViewingVolumeCentroid" type="PointType" minOccurs="0" maxOccurs="1"/>
                <.../>
            </xs:sequence>
        </xs:extension>
    </xs:complexContent>
</xs:complexType>
```

MPEG DASH supports viewpoint attribute, which could be used to signal the centroid of the sub viewing volume. However, the syntax of the Viewpoint attribute is not defined and each Adaptation Set may only contain zero or one ViewingVolumeCentroid. Alternatively the ViewingVolumeCentroid may be defined as three explicit attributes as shown in FIG. 4.

FIG. 4 is an example code excerpt 400 that shows signaling of the centroid of the sub viewing volume. Reference number 402 of FIG. 4 (code also provided below) highlights the signaling.

```
<xs:complexType name="AdaptationSetType">
    <xs:complexContent>
        <xs:extension base="RepresentationBaseType">
            <.../>
            <xs:attribute name="ViewingVolumeCentroidX"
type="xs: float" required="false"/>
            <xs:attribute name="ViewingVolumeCentroidY"
type="xs:float" required="false"/>
            <xs:attribute name="ViewingVolumeCentroidZ"
type="xs:float" required="false"/>
        </xs:extension>
    </xs:complexContent>
</xs:complexType>
```

Figure 5:
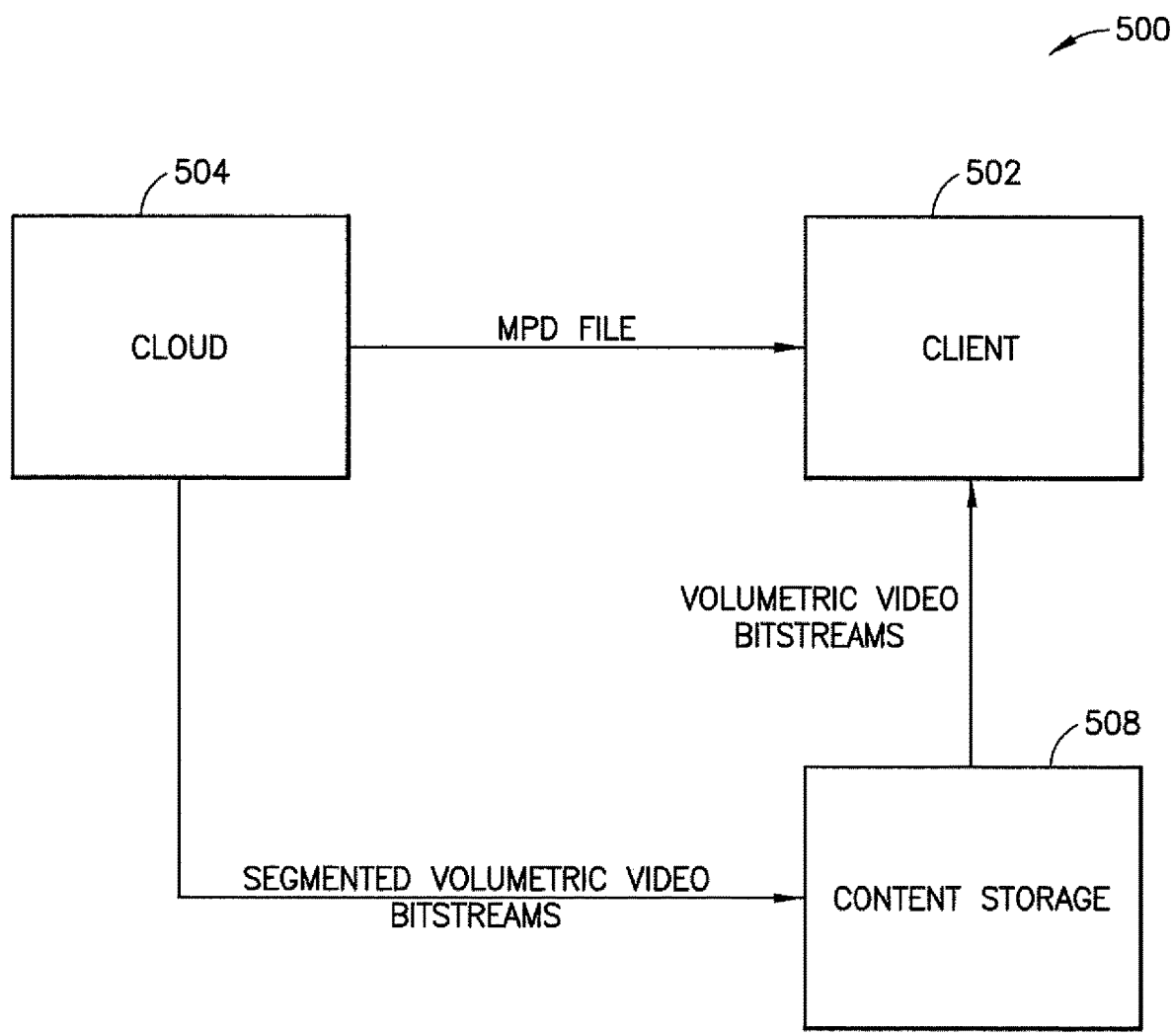
FIG. 5 is a block diagram illustrating the communication between client and server architecture.

FIG. 5 is a block diagram 500 illustrating the communication between client 502 and server 504 architecture. The client 502 simply downloads an MPD file from the server 504. With the information about the ViewingVolumeCentroids in the MPD file, the client 502 is able to select desired sub viewing volumes to be downloaded. The selection of the correct streams is done by the client application logic (e.g., client logic 126 as shown in FIG. 1) based on the viewing point of the user. In particular, FIG. 5 shows content storage 508 providing volumetric video bitstreams to client 502, and receiving segmented volumetric video bitstreams from cloud 504.

Partial MPD streaming. In another embodiment MPD files may be further divided into smaller MPD files, in which case the collection of MPD files defines the entire viewing volume of the scene. This may require additional signaling on the MPD level so that the server and client are able to select the best fitting collection of sub viewing volumes, without having to read viewing volume related information from individual volumetric video streams. The benefit of this embodiment over the previous one is that not all sub viewing volumes need to be signaled in a single MPD file and that the selection process in the server side is very simple for choosing the best fitting MPD file for the client. This would reduce the amount of data that would need to be signaled to the client inside MPD files, thus enabling streaming of large scenes which may contain thousands of sub viewing volumes.

FIG. 6 is an example code excerpt 600 that shows signaling of the sub viewing volume information on the MPD level. Reference number 602 of FIG. 6 (code also provided below) highlights the signaling.

```
<xs:complexType name="MPDtype">
    <xs:sequence>
        <.../>
        <xs:element name="ViewingVolume" type="ShapeType"
minOccurs="0" axOccurs="1"/>
    </xs:sequence>
    <.../>
</xs:complexType>
```

Alternatively, the sub viewing volume information may be signaled within Periods (e.g., Period 204 and/or Period 206), if the sub viewing volume segmentation of the scene is expected to change during playback.

FIG. 7 is an example code excerpt 700 that shows signaling of the sub viewing volume information within Periods. Reference number 702 of FIG. 7 (code also provided below) highlights the signaling.

```
<xs:complexType name="PeriodType">
    <xs:sequence>
        <.../>
        <xs:element name="ViewingVolume" type="ShapeType"
minOccurs="0" maxOccurs="1"/>
    </xs:sequence>
    <.../>
</xs:complexType>
```

Figure 8:
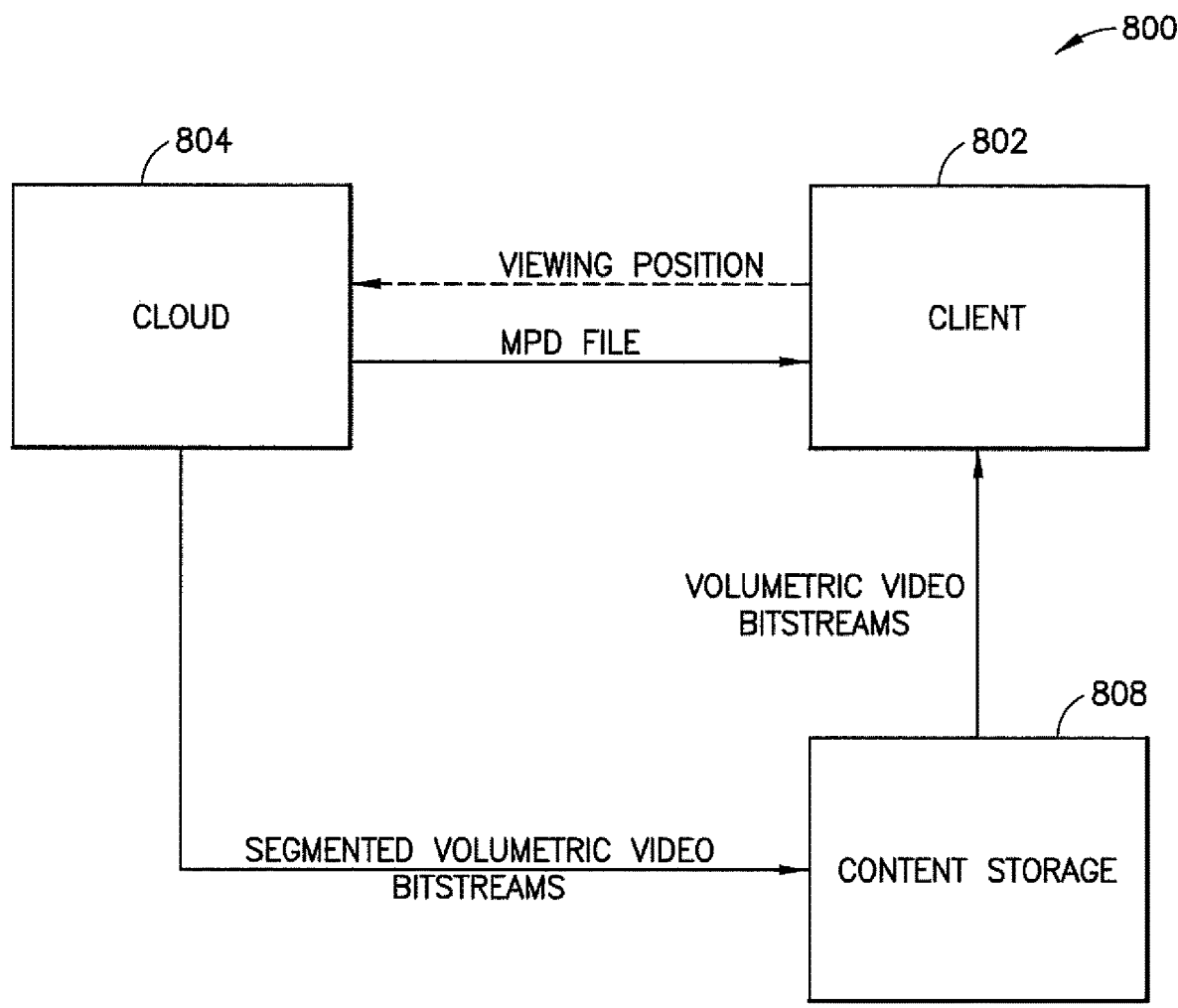
FIG. 8 is a block diagram illustrating signaling between the client and the server.

FIG. 8 is a block diagram 800 illustrating signaling between the client 802 and the server 804. The client 802 requests an MPD file from the server 804 by providing its viewing position to the server 804. The server 804 picks the best partial viewing volume containing MPD file and sends it to the client 802. On the client side, the application selects the desired sub viewing volumes based on user viewing point and downloads only required streams of volumetric data. In particular, FIG. 8 shows content storage 808 providing volumetric video bitstreams to client 802, and receiving segmented volumetric video bitstreams from cloud 804.

Utilization of index files for MPD scene segmentation. In another embodiment an index file listing URLs for sub viewing volume MPD files may be used. The index file may be communicated outside of DASH MPD for example as a JSON object via HTTP request. As an example, the scene description may be defined as the following kind of JSON file.

```
{
    "scene": {
        "id": 1,
        "viewing_volume": {"ShapeType"},
        "base_url": "https://server.com/content/scene/"
        /* other useful metadata */
    },
    "sub_viewing_volumes":[
        /* list of sub viewing volumes */
        {
            "viewing_volume": {"ShapeType"},
            "mpd_url": "volume_01.mpd"
        },
        {
            "viewing_volume": {"ShapeType"},
            "mpd_url": "volume_02.mpd"
        }
    ]
}
```

Viewing volume may be defined using a similar ShapeType construct as described in embodiment 0.

URI scheme based scene segmentation. In another embodiment the scene could be divided into static sub viewing volumes for which a URI scheme may be developed. As an example, the entire viewing volume may be divided into a 16×16×16 grid. Each grid item, i.e. sub viewing volume, may have a scheme ID which may describe its relative position in the entire viewing volume. When the client knows either the size of the entire viewing volume or size of the current sub viewing volume, it is able to request the correct next sub viewing volume from the server without having to communicate any additional information to the server. The size of the entire viewing volume may be communicated off-band or as an MPD level viewing volume element. The size of individual sub-viewing volumes may be communicated as Adaptation Set level viewing volume elements.

As an example, the URI scheme may work as follows https://server.com/content/scene/:id/:xx/:yy/:zz. (:id) may be used to indicate scene id. (:xx) indicates the sub division index on the x-axis, (:yy) indicates the sub division index on the y-axis and (:zz) indicates the sub division index on the z-axis. If the client knows that its current sub viewing volume URI is https://server.com/content/scene/1/08/10/00/desc.mpd and the user is moving forward in the y-axis, the neighboring sub viewing volume URI in the positive y-axis direction may have (:yy)=11, which may be associated with the following url: https://server.com/content/scene/1/08/11/00/desc.mpd Alternatively the client may know the size of the entire viewing volume and that it is divided into equal static sub viewing volumes e.g. 16×16×16 grid. The client is able to request specific sub viewing volume with any viewing point within the viewing volume by using the scheme described above.

Communication of the URI scheme, viewing volume size and sub division information may be done off band. Below is an example, how the above scheme could be specified as a JSON object.

```
{
    "scene": {
        "id": 1,
        "viewing_volume": {"ShapeType"},
        "base_url":
"https://server.com/content/scene/:id/:xx/:yy/:zz"
        "sub_divisions": {
            "type": "static_uniform_grid",
            "x": [16, ":xx"],
            "y": [16, ":yy"],
            "z": [16, ":zz"]
        },
        /* other useful metadata */
    }
}
```

Figure 9:
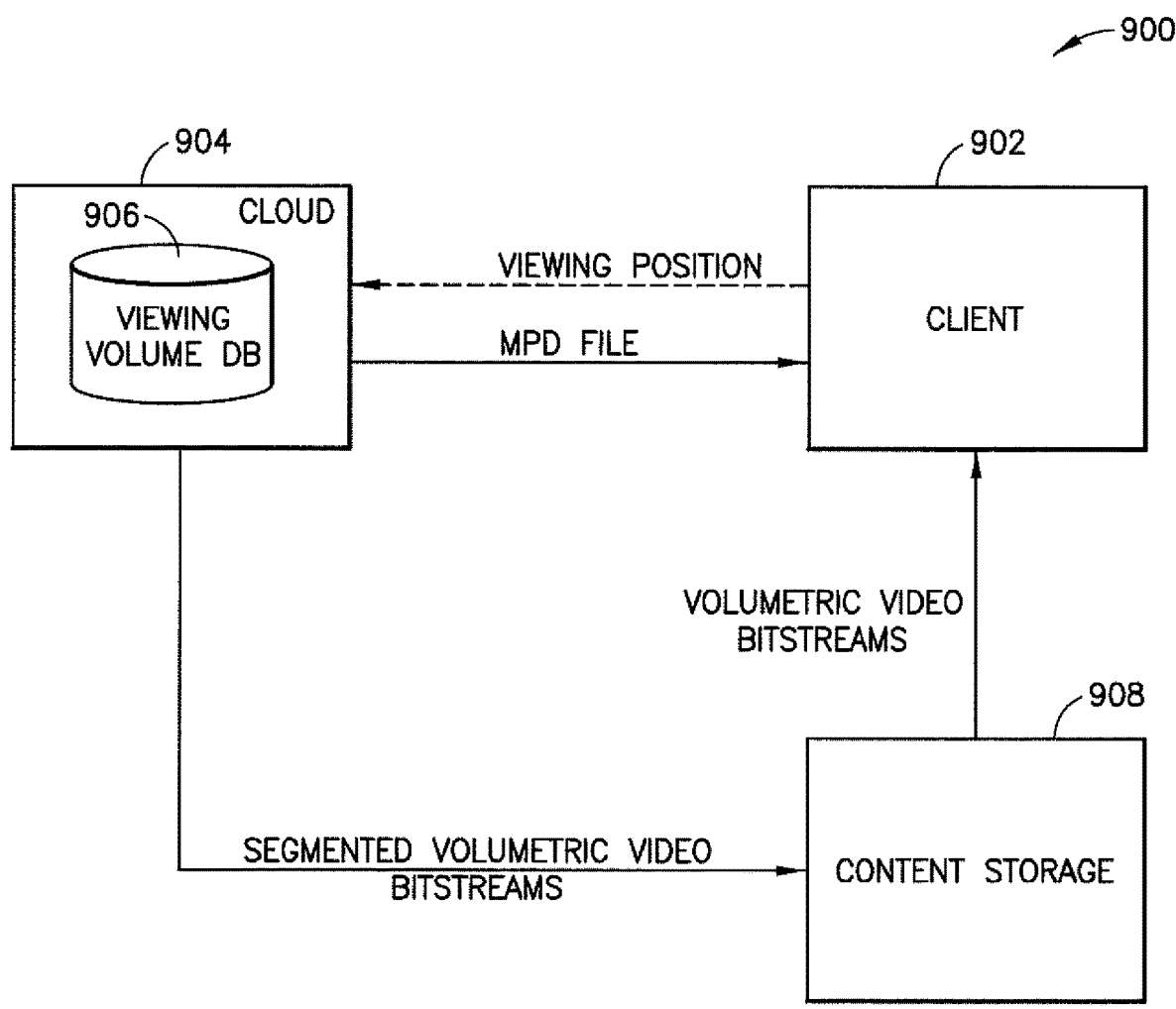
FIG. 9 is a diagram that depicts communication of the user viewing position by the client and database on the server that is used to store information about each sub viewing volume and associated content storage url.

Dynamic MPD file with server-side logic and client return channel. In another embodiment MPD files may be dynamically created based on client device viewing position. FIG. 9 is a diagram 900 illustrating embodiment 5, depicting communication of the user viewing position by the client 902 and database 906 on the server 904 that is used to store information about each sub viewing volume and associated content storage url. The server 904 constructs MPD files on the fly that contain only relevant sub viewing volume information for each client. To enable flexible switching between sub viewing volumes the MPD files may contain information about its valid sub viewing volume, so that the client 902 may easily tell when a new MPD may be requested. In particular, FIG. 9 shows content storage 908 providing volumetric video bitstreams to client 902, and receiving segmented volumetric video bitstreams from cloud 904.

This method requires by far the least amount of information submitted within an MPD file, but requires a client-server architecture, where the server side contains a database and processing capabilities (implemented by viewing volume DB 906) to reconstruct MPD files on the fly for several different clients.

Hierarchical arrangement of viewing volumes. In another embodiment signaling of parent viewing volumes may be desired in order to hierarchically arrange viewing volumes. This may be implemented by adding (e.g., by appending) an optional parent attribute for ShapeType. This signaling may be particularly useful to cater for devices, which may be able to process larger viewing volumes locally.

```
<xs:complexType name="ShapeType" abstract="true">
    <xs:attribute name="id" type="xs:unsignedInt" required="true"/>
    <xs:attribute name="order" type="xs:unsignedInt" required="false"/>
        <xs:attribute name="parent" type="xs:unsignedInt" required="false"/>
            <xs:element name="url" type="xs:string" required="false"/>
        <xs:sequence>
            <xs:element name="child" type="ShapeType" minOccurs="0" maxOccurs="unbounded"/>
        </xs:sequence>
</xs:complexType>
```

The parent attribute of ShapeType indicates the id of the parent sub viewing volume shape. Following this information the client is able to identify what parent viewing volume contains which sub viewing volume. The ShapeType may also contain a list of child nodes, which may contain a sub volume of the parent shape. With the afore described signaling the client is able to navigate deeper in the viewing volume by following the url linking of parent and child ShapeTypes.

Additional viewing orientation information. In another embodiment viewing orientation in addition to viewing volume may be signaled. Viewing direction may be signaled with normalized direction vector with x, y and z components. In addition, vertical and horizontal field of view values may be signaled. This may enable more fine grained viewing volume definition. DirectionType may be added to ShapeType to add directionality information to viewing volume.

```
<xs:complexType name="DirectionType">
    <xs:attribute name="x" type="xs:float" required="true"/>
    <xs:attribute name="y" type="xs:float" required="true"/>
    <xs:attribute name="z" type="xs:float" required="true"/>
    <xs:attribute name="FOVX" type="xs:float" required="false"/>
    <xs:attribute name="FOVY" type="xs:float" required="false"/>
    <xs:attribute name="url" type="xs:string" required="true"/>
</xs:complexType>
<xs:complexType name="ShapeType" abstract="true">
    <xs:attribute name="id" type="xs:unsignedInt" required="true"/>
    <xs:attribute name="order" type="xs:unsignedInt" required="false"/>
        <xs:element name="direction" type="DirectionType" required="false"/>
</xs:complexType>
```

Relative URIs between MPDS. In another embodiment viewing volumes may be linked together by exit directions to provide easy accessible MPD links, when the client is exiting local viewing volume in a specific direction. When exiting the sub viewing volume in a specific exit direction, the client may directly fetch the MPD for the next sub viewing volume in the exit direction. This signaling may be performed outside of MPD files to provide additional flexibility or may be added inside MPD files, if needed. With this information available for the client, it becomes less dependent on the server side component. Exit directions may be defined either as geographic compass points, 3d axes or arbitrary direction vectors.

```
<xs:complexType name="ExitDirectionType" abstract="true">
</xs:complexType>
<xs:complexContent name="CompassExitDirection">
    <xs:extension base="ExitDirectionType">
        <xs:element name="north" type="xs:string" required="false"/>
        <xs:element name="east" type="xs:string" required="false"/>
        <xs:element name="south" type="xs:string" required="false"/>
        <xs:element name="west" type="xs:string" required="false"/>
        <xs:element name="up" type="xs:string" required="false"/>
        <xs:element name="down" type="xs:string" required="false"/>
    </xs:extension>
</xs:complexContent>
<xs:complexContent name="AxesExitDirection">
    <xs:extension base="ExitDirectionType">
        <xs:element name="PosX" type="xs:string" required="false"/>
        <xs:element name="NegX" type="xs:string" required="false"/>
        <xs:element name="PosY" type="xs:string" required="false"/>
        <xs:element name="NegY" type="xs:string" required="false"/>
        <xs:element name="PosZ" type="xs:string" required="false"/>
        <xs:element name="NegZ" type="xs:string" required="false"/>
    </xs:extension>
</xs:complexContent>
<xs:complexType name="DirectionType">
    <xs:attribute name="x" type="xs:float" required="true"/>
    <xs:attribute name="y" type="xs:float" required="true"/>
    <xs:attribute name="z" type="xs:float" required="true"/>
    <xs:attribute name="url" type="xs:string" required="true"/>
</xs:complexType>
<xs:complexContent name="AnyExitDirection">
    <xs:extension base="ExitDirectionType">
        <xs:sequence>
            <xs:element name="direction" type="DirectionType" minOccurs="0" maxOccurs="unbounded"/>
        </xs:sequence>
    </xs:extension>
</xs:complexContent>
<xs:complexType name="ShapeType" abstract="true">
    <xs:attribute name="id" type="xs:unsignedInt" required="true"/>
    <xs:attribute name="order" type="xs:unsignedInt" required="false"/>
    <xs:attribute name="parent" type="xs:unsignedInt" required="false"/>
    <xs:element name="url" type="xs:string" required="false"/>
    <xs:element name="ExitDirection" type="ExitDirectionType" required="false"/>
</xs:complexType>
```

The url in the ShapeType may refer to MPD or content url for the given sub viewing volume, whereas the strings in ExitDirectionTypes may give the associated url for MPD for the surrounding sub viewing volumes. By following the exit direction links the client is able to request neighboring sub viewing volumes simply by following the directionality. The client may from time to time end up in a situation where it may need to fetch two or more neighboring sub viewing volumes, in which case the client fetches the MPD files for all needed sub viewing volumes, but only downloads the partial sub viewing volume video streams needed.

The main advantage of the examples described herein is to enable consumption of 6DoF content by enabling selective streaming of volumetric sub volumes. Such mechanisms are required due to the size of volumetric scenes, which cannot be locally stored.

Figure 10:
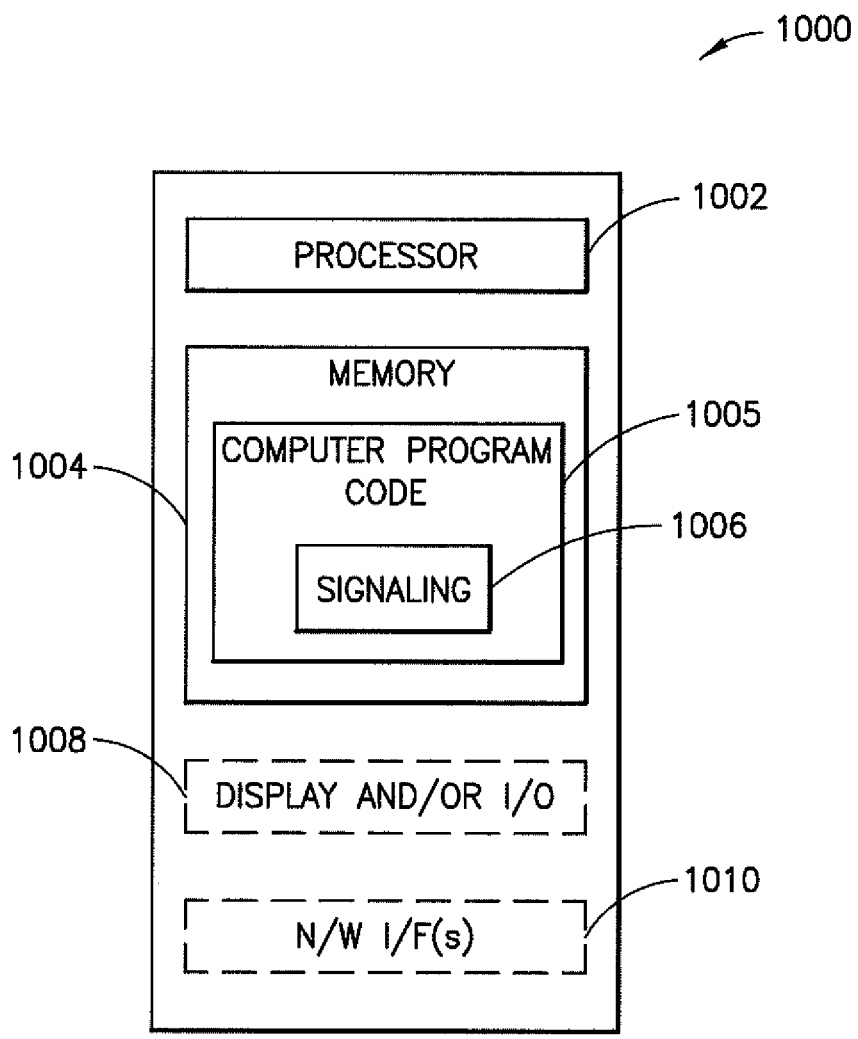
FIG. 10 is an example apparatus configured to implement six degrees of freedom spatial layout signaling, based on the examples described herein.

FIG. 10 is an example apparatus 1000, which may be implemented in hardware, configured to implement six degrees of freedom spatial layout signaling, based on the examples described herein. The apparatus 1000 comprises a processor 1002, at least one non-transitory memory 1004 including computer program code 1005, wherein the at least one memory 1004 and the computer program code 1005 are configured to, with the at least one processor 1002, cause the apparatus to implement circuitry, a process, component, module, or function (collectively 1006) to implement the signaling as described herein. The apparatus 1000 optionally includes a display and/or I/O interface 1008 that may be used to display aspects or a status of the methods described herein (e.g., as the methods are being performed or at a subsequent time). The display and/or I/O interface 1008 may also be configured to receive input such as user input. The apparatus 1000 also optionally includes one or more network (NW) interfaces (I/F(s)) 1010. The NW I/F(s) 1010 may be wired and/or wireless and communicate over the Internet/other network(s) via any communication technique. The NW I/F(s) 1010 may comprise one or more transmitters and one or more receivers. The apparatus 1000 may be configured as a server or client based on the signaling aspects described herein (for example, apparatus 1000 may be a remote, virtual or cloud apparatus).

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory 1004 may be implemented using any suitable data storage technology, such as semiconductor based memory devices, flash memory, magnetic memory devices and systems, optical memory devices and systems, fixed memory and removable memory. The memory 1004 may comprise a database for storing data.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

Figure 11:
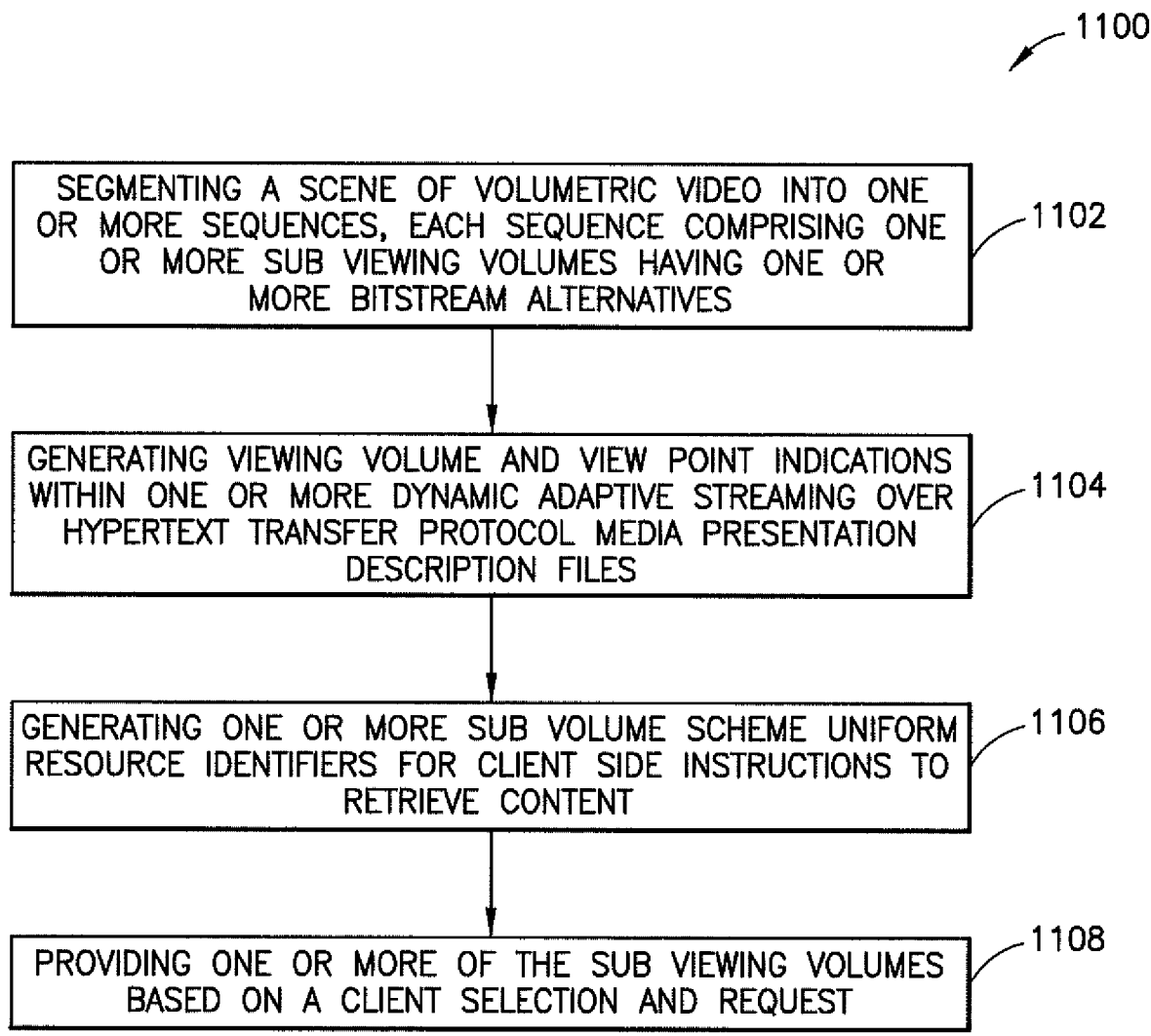
FIG. 11 shows an example method to implement six degrees of freedom spatial layout signaling, based on the examples described herein.

FIG. 11 is an example method 1100 that implements six degrees of freedom spatial layout signaling based on the examples described herein. At 1102, the method includes segmenting a scene of volumetric video into one or more sequences, each sequence comprising one or more sub viewing volumes having one or more bitstream alternatives. At 1104, the method includes generating viewing volume and view point indications within one or more dynamic adaptive streaming over hypertext transfer protocol media presentation description files. At 1106, the method includes generating one or more sub volume scheme uniform resource identifiers for client side instructions to retrieve content. At 1108, the method includes providing one or more of the sub viewing volumes based on a client selection and request. The method 1100 may be performed by a server.

Figure 12:
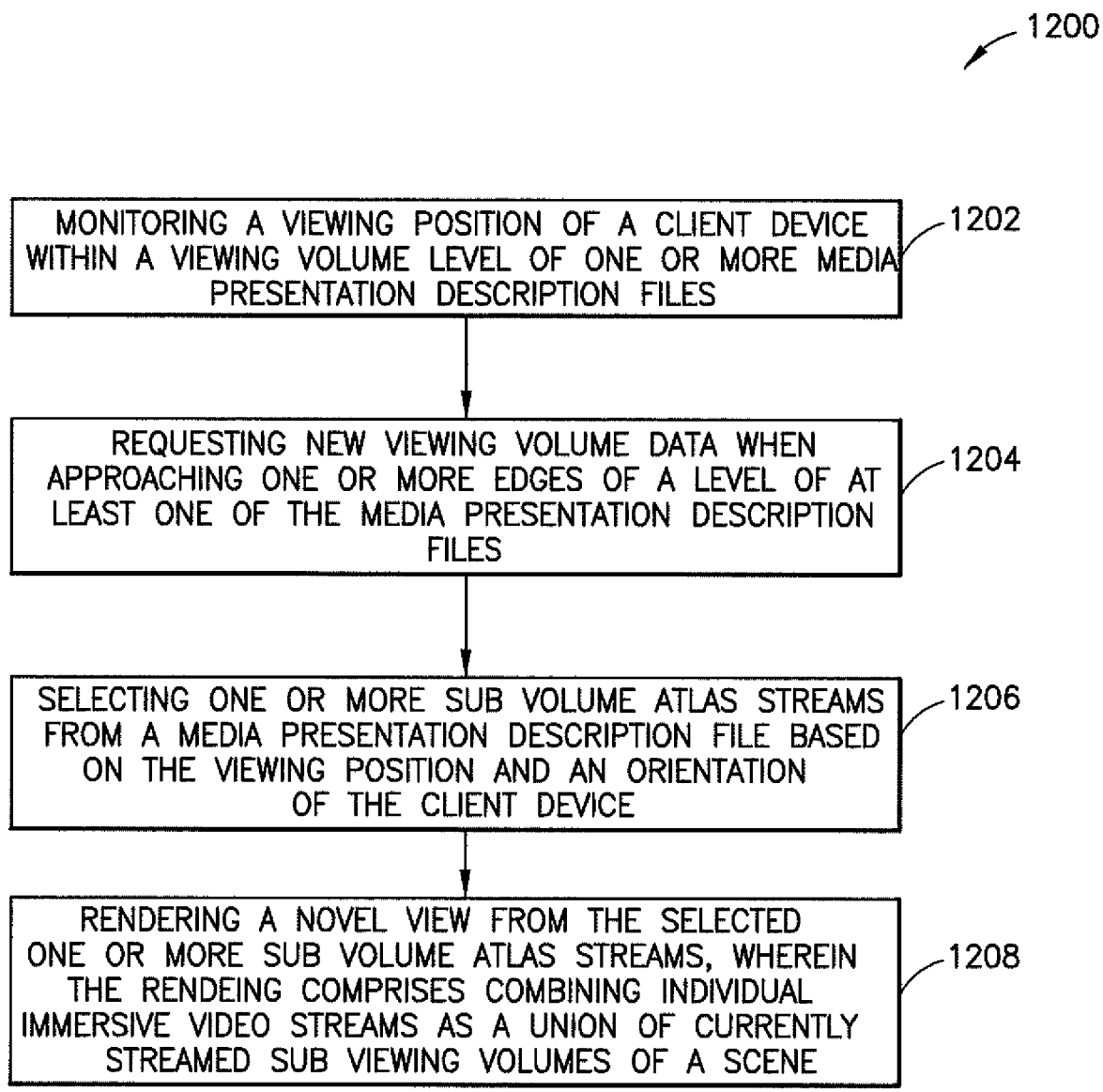
FIG. 12 shows another example method to implement six degrees of freedom spatial layout signaling, based on the examples described herein.

FIG. 12 is an example method 1200 that implements six degrees of freedom spatial layout signaling, based on the examples described herein. At 1202, the method includes monitoring a viewing position of a client device within a viewing volume level of one or more media presentation description files. At 1204, the method includes requesting new viewing volume data when approaching one or more edges of a level of at least one of the media presentation description files. At 1206, the method includes selecting one or more sub volume atlas streams from a media presentation description file based on the viewing position and an orientation of the client device. At 1208, the method includes rendering a novel view from the selected one or more sub volume atlas streams, wherein the rendering comprises combining individual immersive video streams as a union of currently streamed sub viewing volumes of a scene. The method 1200 may be performed by a client.

An example apparatus includes at least one processor; and at least one non-transitory memory including computer program code; wherein the at least one memory and the computer program code are configured to, with the at least one processor, cause the apparatus at least to perform: segment a scene of volumetric video into one or more sequences, each sequence comprising one or more sub viewing volumes having one or more bitstream alternatives; generate viewing volume and view point indications within one or more dynamic adaptive streaming over hypertext transfer protocol media presentation description files; generate one or more sub volume scheme uniform resource identifiers for client side instructions to retrieve content; and provide one or more of the sub viewing volumes based on a client selection and request.

The apparatus may further include wherein centroids of the sub viewing volumes form a grid or tetrahedral mesh for selecting preferred sub viewing volumes for any viewing point within a larger viewing volume.

The apparatus may further include wherein the at least one memory and the computer program code are further configured to, with the at least one processor, cause the apparatus at least to perform: define data structures for dynamic adaptive streaming over hypertext transfer protocol, wherein the data structures comprise a three-dimensional point in space, a set of shapes used to generate the sub viewing volumes, a number of groups of shapes, and an operator primitive to combine the shapes and the groups of shapes.

The apparatus may further include wherein the at least one memory and the computer program code are further configured to, with the at least one processor, cause the apparatus at least to perform: signal information about the centroids of the sub viewing volumes to the adaptation sets using one or more viewpoint attributes.

The apparatus may further include wherein the at least one memory and the computer program code are further configured to, with the at least one processor, cause the apparatus at least to perform: divide the media presentation description files into smaller media presentation description files; provide signaling information about the sub viewing volumes, wherein the signaling information about the sub viewing volumes is provided using at least one of one or more levels of the media presentation description files, or one or more periods of the media presentation description files; receive a request for a media presentation description file based on a viewing position of a client; select a partial viewing volume containing the requested media presentation description file; and provide the selected partial viewing volume to the client.

The apparatus may further include wherein the at least one memory and the computer program code are further configured to, with the at least one processor, cause the apparatus at least to perform: implement an index file listing uniform resource locators for the sub viewing volume of the media presentation description files.

The apparatus may further include wherein the at least one memory and the computer program code are further configured to, with the at least one processor, cause the apparatus at least to perform: implement a uniform resource identifier scheme to associate a segmented static sub viewing volume with a particular uniform resource locator.

The apparatus may further include wherein the at least one memory and the computer program code are further configured to, with the at least one processor, cause the apparatus at least to perform: dynamically create the media presentation description files based on a client device viewing position.

The apparatus may further include wherein the at least one memory and the computer program code are further configured to, with the at least one processor, cause the apparatus at least to perform: hierarchically arrange viewing volumes based on signaling of parent sub viewing volumes.

The apparatus may further include wherein the at least one memory and the computer program code are further configured to, with the at least one processor, cause the apparatus at least to perform: signal a viewing orientation of a sub viewing volume.

The apparatus may further include wherein the at least one memory and the computer program code are further configured to, with the at least one processor, cause the apparatus at least to perform: link sub viewing volumes by exit direction.

An example apparatus includes at least one processor; and at least one non-transitory memory including computer program code; wherein the at least one memory and the computer program code are configured to, with the at least one processor, cause the apparatus at least to perform: monitor a viewing position of a client device within a viewing volume level of one or more media presentation description files; request new viewing volume data when approaching one or more edges of a level of at least one of the media presentation description files; select one or more sub volume atlas streams from a media presentation description file based on the viewing position and orientation of the client device; and render a novel view from the selected one or more sub volume atlas streams, wherein the rendering comprises combining individual immersive video streams as a union of currently streamed sub viewing volumes of a scene.

The apparatus may further include wherein the viewing volume data has been segmented into one or more sequences, each sequence comprising one or more sub viewing volumes having one or more bitstream alternatives.

The apparatus may further include wherein centroids of the sub viewing volumes form a grid or tetrahedral mesh for selecting preferred sub viewing volumes for any viewing point within a larger viewing volume.

The apparatus may further include wherein data structures for dynamic adaptive streaming over hypertext transfer protocol are defined, wherein the data structures comprise a three-dimensional point in space, a set of shapes used to generate the sub viewing volumes, a number of groups of shapes, and an operator primitive to combine the shapes and the groups of shapes.

The apparatus may further include wherein the at least one memory and the computer program code are further configured to, with the at least one processor, cause the apparatus at least to perform: download a media presentation description file from a server, and selecting a desired sub viewing volume based on information about the centroids in the media presentation description file.

The apparatus may further include wherein the at least one memory and the computer program code are further configured to, with the at least one processor, cause the apparatus at least to perform: request the media presentation description file based on the viewing position of the client device; select a partial viewing volume containing the requested media presentation description file based on a client viewing point; and receive the selected partial viewing volume from a server; wherein the media presentation description files have been divided into smaller media presentation description files.

The apparatus may further include wherein the at least one memory and the computer program code are further configured to, with the at least one processor, cause the apparatus at least to perform: implement an index file listing uniform resource locators for the sub viewing volumes of the media presentation description file.

The apparatus may further include wherein the at least one memory and the computer program code are further configured to, with the at least one processor, cause the apparatus at least to perform: request a segmented static sub viewing volume based on an associated uniform resource identifier.

The apparatus may further include wherein the media presentation description files are dynamically created based on the viewing position of the client device.

The apparatus may further include wherein viewing volumes are hierarchically arranged based on signaling of parent sub viewing volumes.

The apparatus may further include wherein a viewing orientation of a sub viewing volume is signaled.

The apparatus may further include wherein the at least one memory and the computer program code are further configured to, with the at least one processor, cause the apparatus at least to perform: request the media presentation description file for a next sub viewing volume in an exit direction.

An example method includes segmenting a scene of volumetric video into one or more sequences, each sequence comprising one or more sub viewing volumes having one or more bitstream alternatives; generating viewing volume and view point indications within one or more dynamic adaptive streaming over hypertext transfer protocol media presentation description files; generating one or more sub volume scheme uniform resource identifiers for client side instructions to retrieve content; and providing one or more of the sub viewing volumes based on a client selection and request.

An example method includes monitoring a viewing position of a client device within a viewing volume level of one or more media presentation description files; requesting new viewing volume data when approaching one or more edges of a level of at least one of the media presentation description files; selecting one or more sub volume atlas streams from a media presentation description file based on the viewing position and an orientation of the client device; and rendering a novel view from the selected one or more sub volume atlas streams, wherein the rendering comprises combining individual immersive video streams as a union of currently streamed sub viewing volumes of a scene.

An example non-transitory program storage device readable by a machine, tangibly embodying a program of instructions executable by the machine for performing operations may be provided, the operations comprising: segmenting a scene of volumetric video into one or more sequences, each sequence comprising one or more sub viewing volumes having one or more bitstream alternatives; generating viewing volume and view point indications within one or more dynamic adaptive streaming over hypertext transfer protocol media presentation description files; generating one or more sub volume scheme uniform resource identifiers for client side instructions to retrieve content; and providing one or more of the sub viewing volumes based on a client selection and request.

An example non-transitory program storage device readable by a machine, tangibly embodying a program of instructions executable by the machine for performing operations may be provided, the operations comprising: monitoring a viewing position of a client device within a viewing volume level of one or more media presentation description files; requesting new viewing volume data when approaching one or more edges of a level of at least one of the media presentation description files; selecting one or more sub volume atlas streams from a media presentation description file based on the viewing position and an orientation of the client device; and rendering a novel view from the selected one or more sub volume atlas streams, wherein the rendering comprises combining individual immersive video streams as a union of currently streamed sub viewing volumes of a scene.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
    at least one processor; and
    at least one non-transitory memory including computer program code;
    wherein the at least one memory and the computer program code are configured to, with the at least one processor, cause the apparatus at least to:
    segment a scene of volumetric video into one or more sequences, each sequence comprising one or more sub viewing volumes having one or more bitstream alternatives;
    generate viewing volume and view point indications within one or more dynamic adaptive streaming over hypertext transfer protocol media presentation description files;

generate one or more sub volume scheme uniform resource identifiers for client side instructions to retrieve content;

provide one or more of the sub viewing volumes based on a client selection and request; and hierarchically arrange viewing volumes based on signaling of parent sub viewing volumes.

2. The apparatus of claim 1, wherein centroids of the sub viewing volumes form a grid or tetrahedral mesh for selecting preferred sub viewing volumes for any viewing point within a larger viewing volume.

3. The apparatus of claim 1, wherein the at least one memory and the computer program code are further configured to, with the at least one processor, cause the apparatus at least to:

define data structures for dynamic adaptive streaming over hypertext transfer protocol, wherein the data structures comprise a three-dimensional point in space, a set of shapes used to generate the sub viewing volumes, a number of groups of shapes, and an operator primitive to combine the shapes and the groups of shapes.

4. The apparatus of claim 1, wherein the at least one memory and the computer program code are further configured to, with the at least one processor, cause the apparatus at least to:

signal information about centroids of the sub viewing volumes to the adaptation sets using one or more viewpoint attributes.

5. The apparatus of claim 1, wherein the at least one memory and the computer program code are further configured to, with the at least one processor, cause the apparatus at least to:

divide the media presentation description files into smaller media presentation description files;

provide signaling information about the sub viewing volumes, wherein the signaling information about the sub viewing volumes is provided using at least one of one or more levels of the media presentation description files, or one or more periods of the media presentation description files;

receive a request for a media presentation description file based on a viewing position of a client;

select a partial viewing volume containing the requested media presentation description file; and provide the selected partial viewing volume to the client.

6. The apparatus of claim 1, wherein the at least one memory and the computer program code are further configured to, with the at least one processor, cause the apparatus at least to:

implement an index file listing uniform resource locators for the sub viewing volume of the media presentation description files.

7. The apparatus of claim 1, wherein the at least one memory and the computer program code are further configured to, with the at least one processor, cause the apparatus at least to:

implement a uniform resource identifier scheme to associate a segmented static sub viewing volume with a particular uniform resource locator.

8. The apparatus of claim 1, wherein the at least one memory and the computer program code are further configured to, with the at least one processor, cause the apparatus at least to:

dynamically create the media presentation description files based on a client device viewing position.

9. The apparatus of claim 1, wherein the at least one memory and the computer program code are further configured to, with the at least one processor, cause the apparatus at least to:

signal a viewing orientation of a sub viewing volume.

10. The apparatus of claim 1, wherein the at least one memory and the computer program code are further configured to, with the at least one processor, cause the apparatus at least to:

link sub viewing volumes by exit direction.

11. An apparatus comprising:

at least one processor; and at least one non-transitory memory including computer program code;

wherein the at least one memory and the computer program code are configured to, with the at least one processor, cause the apparatus at least to:

monitor a viewing position of a client device within a viewing volume level of one or more media presentation description files;

request new viewing volume data when approaching one or more edges of a level of at least one of the media presentation description files;

select one or more sub volume atlas streams from a media presentation description file based on the viewing position and an orientation of the client device; and render a novel view from the selected one or more sub volume atlas streams, wherein the rendering comprises combining individual immersive video streams as a union of currently streamed sub viewing volumes of a scene.

12. The apparatus of claim 11, wherein the viewing volume data has been segmented into one or more sequences, each sequence comprising one or more sub viewing volumes having one or more bitstream alternatives.

13. The apparatus of claim 11, wherein centroids of the sub viewing volumes form a grid or tetrahedral mesh for selecting preferred sub viewing volumes for any viewing point within a larger viewing volume.

14. The apparatus of claim 11, wherein data structures for dynamic adaptive streaming over hypertext transfer protocol are defined, wherein the data structures comprise a three-dimensional point in space, a set of shapes used to generate the sub viewing volumes, a number of groups of shapes, and an operator primitive to combine the shapes and the groups of shapes.

15. The apparatus of claim 11, wherein the at least one memory and the computer program code are further configured to, with the at least one processor, cause the apparatus at least to:

download a media presentation description file from a server, and selecting a desired sub viewing volume based on information about centroids in the media presentation description file.

16. The apparatus of claim 11, wherein the at least one memory and the computer program code are further configured to, with the at least one processor, cause the apparatus at least to:

request the media presentation description file based on the viewing position of the client device;

select a partial viewing volume containing the requested media presentation description file based on a client viewing point; and receive the selected partial viewing volume from a server;

wherein the media presentation description files have been divided into smaller media presentation description files.

17. The apparatus of claim 11, wherein the at least one memory and the computer program code are further configured to, with the at least one processor, cause the apparatus at least to:

implement an index file listing uniform resource locators for the sub viewing volumes of the media presentation description file.

18. The apparatus of claim 11, wherein the at least one memory and the computer program code are further configured to, with the at least one processor, cause the apparatus at least to:

request a segmented static sub viewing volume based on an associated uniform resource identifier.

19. The apparatus of claim 11, wherein the media presentation description files are dynamically created based on the viewing position of the client device.

20. The apparatus of claim 11, wherein viewing volumes are hierarchically arranged based on signaling of parent sub viewing volumes.

21. The apparatus of claim 11, wherein a viewing orientation of a sub viewing volume is signaled.

22. The apparatus of claim 11, wherein the at least one memory and the computer program code are further configured to, with the at least one processor, cause the apparatus at least to:

request the media presentation description file for a next sub viewing volume in an exit direction.

23. A method comprising:

segmenting a scene of volumetric video into one or more sequences, each sequence comprising one or more sub viewing volumes having one or more bitstream alternatives;

generating viewing volume and view point indications within one or more dynamic adaptive streaming over hypertext transfer protocol media presentation description files;

generating one or more sub volume scheme uniform resource identifiers for client side instructions to retrieve content;

providing one or more of the sub viewing volumes based on a client selection and request; and signaling information about centroids of the sub viewing volumes to the adaptation sets using one or more viewpoint attributes.

24. A method comprising:

monitoring a viewing position of a client device within a viewing volume level of one or more media presentation description files;

requesting new viewing volume data when approaching one or more edges of a level of at least one of the media presentation description files;

selecting one or more sub volume atlas streams from a media presentation description file based on the viewing position and an orientation of the client device; and rendering a novel view from the selected one or more sub volume atlas streams, wherein the rendering comprises combining individual immersive video streams as a union of currently streamed sub viewing volumes of a scene.

* * * * *